(12) United States Patent
Tyler

(10) Patent No.: US 6,568,238 B2
(45) Date of Patent: May 27, 2003

(54) CASTER ADJUSTMENT TOOL

(75) Inventor: Terry R. Tyler, Ozawkie, KS (US)

(73) Assignee: TLT Fabrications, Inc., Ozawkie, KS (US)

( * ) Notice: Subject to any disclaimer, the term of this patent is extended or adjusted under 35 U.S.C. 154(b) by 0 days.

(21) Appl. No.: 09/954,960

(22) Filed: Sep. 18, 2001

(65) Prior Publication Data

US 2003/0051528 A1 Mar. 20, 2003

(51) Int. Cl.[7] .................................................. B21D 1/12
(52) U.S. Cl. ............................................ 72/457; 72/704
(58) Field of Search .......................... 72/457, 704, 705

(56) References Cited

U.S. PATENT DOCUMENTS

| | | | |
|---|---|---|---|
| 2,365,731 A | 12/1944 | Simons | |
| 2,427,536 A | 9/1947 | Simons | |
| 2,431,291 A | 11/1947 | Wochner | |
| 3,199,837 A | * 8/1965 | Vestal et al. | .................... 72/704 |
| 3,777,542 A | 12/1973 | Foshee et al. | |
| 3,888,100 A | 6/1975 | Chisum | |
| 4,178,791 A | 12/1979 | Daniel | |
| 4,238,951 A | * 12/1980 | Grainger et al. | ............... 72/705 |
| 4,485,662 A | 12/1984 | Justice | |
| 4,560,131 A | 12/1985 | Eck | |
| 5,044,191 A | * 9/1991 | Combs | ......................... 72/705 |
| 5,596,900 A | 1/1997 | Pietrelli | |
| 5,623,846 A | 4/1997 | Brewer, Jr. | |

* cited by examiner

*Primary Examiner*—Lowell A. Larson
(74) *Attorney, Agent, or Firm*—Chase Law Firm, L.C.

(57) ABSTRACT

The caster angle of a unibody vehicle may be adjusted by securing a fixed frame member to the vehicle's rocker panel pinch weld to provide an anchor point for adjustment. An hydraulic porter power ram mounted between the forward end of the frame leg and the lower control arm of the steering assembly is used to push the lower control arm forward to the proper caster angle. A stabilizing bar attached to the fixed frame member minimizes twisting of the fixed frame member under hydraulic pressure.

15 Claims, 4 Drawing Sheets

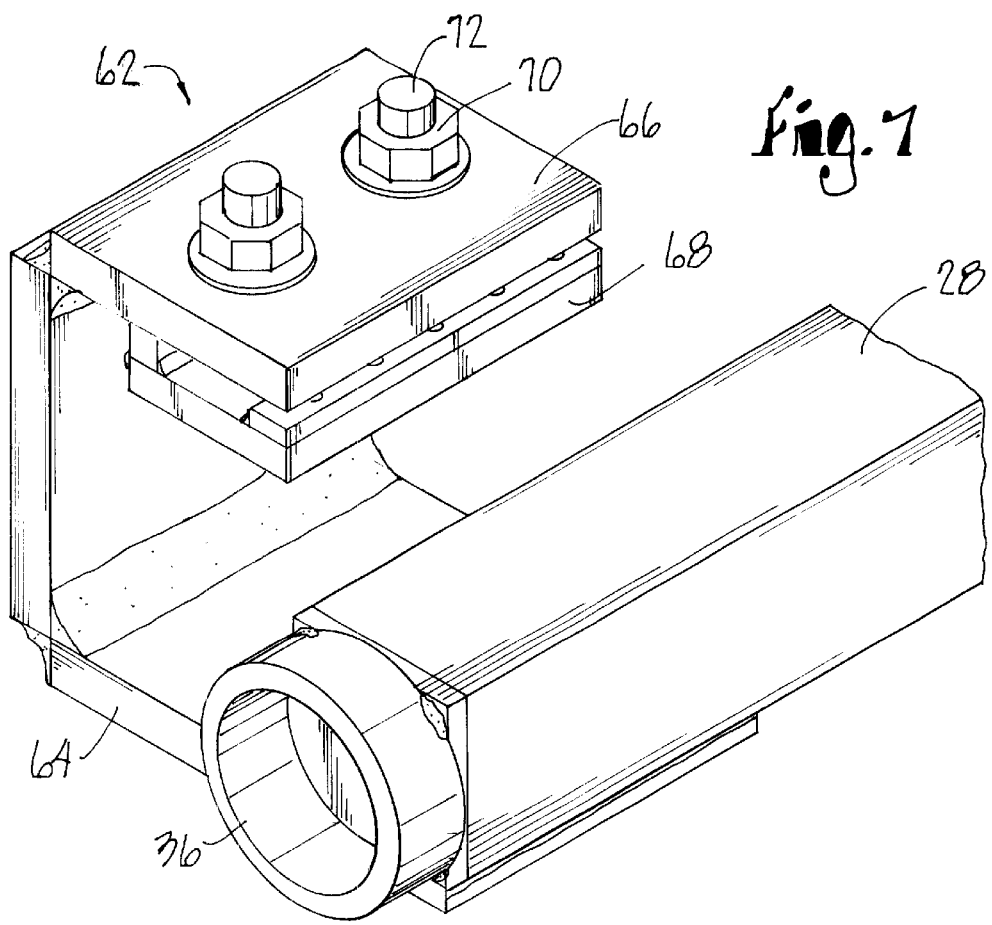
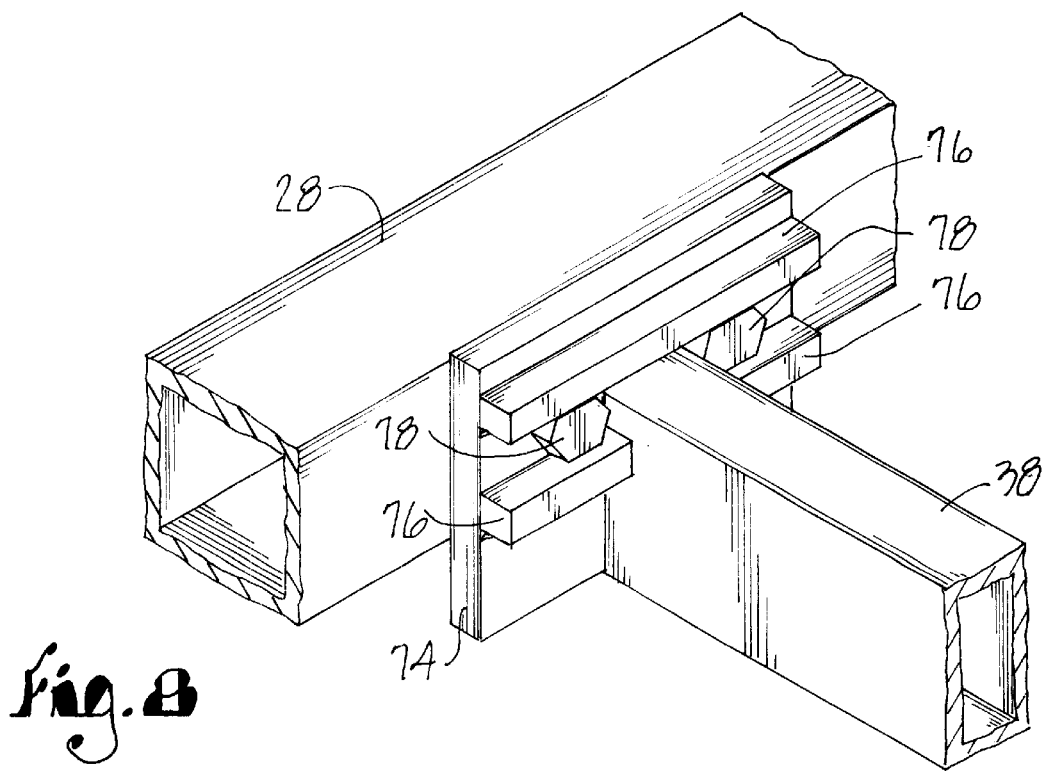

CASTER ADJUSTMENT TOOL

BACKGROUND OF THE INVENTION

This invention relates to an automotive caster alignment tool and, in particular, to a tool to adjust and repair the caster angle of the right or left hand strut of unibody cars.

In most unibody cars of today, the caster is not adjustable. "Caster" refers to the angle of the steering axis in relation to an imaginary, vertical line through the center of the wheel when viewed through from the side of the wheel. "Positive caster" is the term used when the vertical line is tilted toward the rear of the vehicle. "Negative caster" is the term used when the vertical line is tilted forward. The proper caster angle stabilizes the car for better steering and handling.

When the caster is pushed back on the right hand side of the vehicle, for example, the vehicle will pull or drift to the right causing handling problems. This may be caused by bumping into a curb or a parking block in a parking lot. The automobile owner may bring his or her car into an alignment shop for a front end alignment. The alignment equipment is mounted to the front wheels of the car and various measurements are made such as camber, caster, toe and thrust. If a caster problem is found, all the alignment equipment is removed from the car and the car has to be transported to a frame shop.

To repair or adjust the caster angle it is known in the art to use a frame machine to pull the caster to the proper angle. Typically, alignment shops do not have a frame machine because of the space requirements and cost of such equipment. Often because of inaccuracies at the frame shop, the car must be transported back and forth between the frame shop and the alignment shop multiple times at an increased cost to the alignment shop. The only way to pull lower control arm on one side of the car back into place using a frame machine is to compare its position to the position of the lower control arm on the other side of the car. If both control arms are out of position, then the adjustment made on the frame machine will be incorrect.

SUMMARY OF THE INVENTION

It is therefore a primary object of the present invention to provide a caster adjustment tool, which may be used to adjust the caster to the proper angle without removing the front end alignment equipment.

Another important object of the present invention is to provide a caster adjustment tool, as aforesaid, which may be used to repair or adjust the caster angle of the right or left hand strut of a unibody car.

Still another important object of the present invention is to provide a caster adjustment tool, as aforesaid, which is relatively simple to use.

Yet another object of the present invention is to provide a caster adjustment tool, as aforesaid, which is relatively inexpensive.

These and other objects of the present invention are achieved by a caster adjustment tool which may be mounted to the pinch weld below the rocker panel along either side of the vehicle. A hydraulic jack or other means such as a jack screw may be used to push the lower pivoting point of the steering and suspension forward to achieve the proper caster angle for proper drivability of the vehicle.

BRIEF DESCRIPTION OF THE DRAWINGS

FIG. 7 is an enlarged perspective view of a horizontal pinch weld clamp of the caster adjustment tool of the present invention.

FIG. 8 is an enlarged perspective view of the torsion bar attachment to the horizontal bar of the caster adjustment tool of the present invention along line 8 of FIG. 4.

BRIEF DESCRIPTION OF THE DRAWINGS

Figure 1:
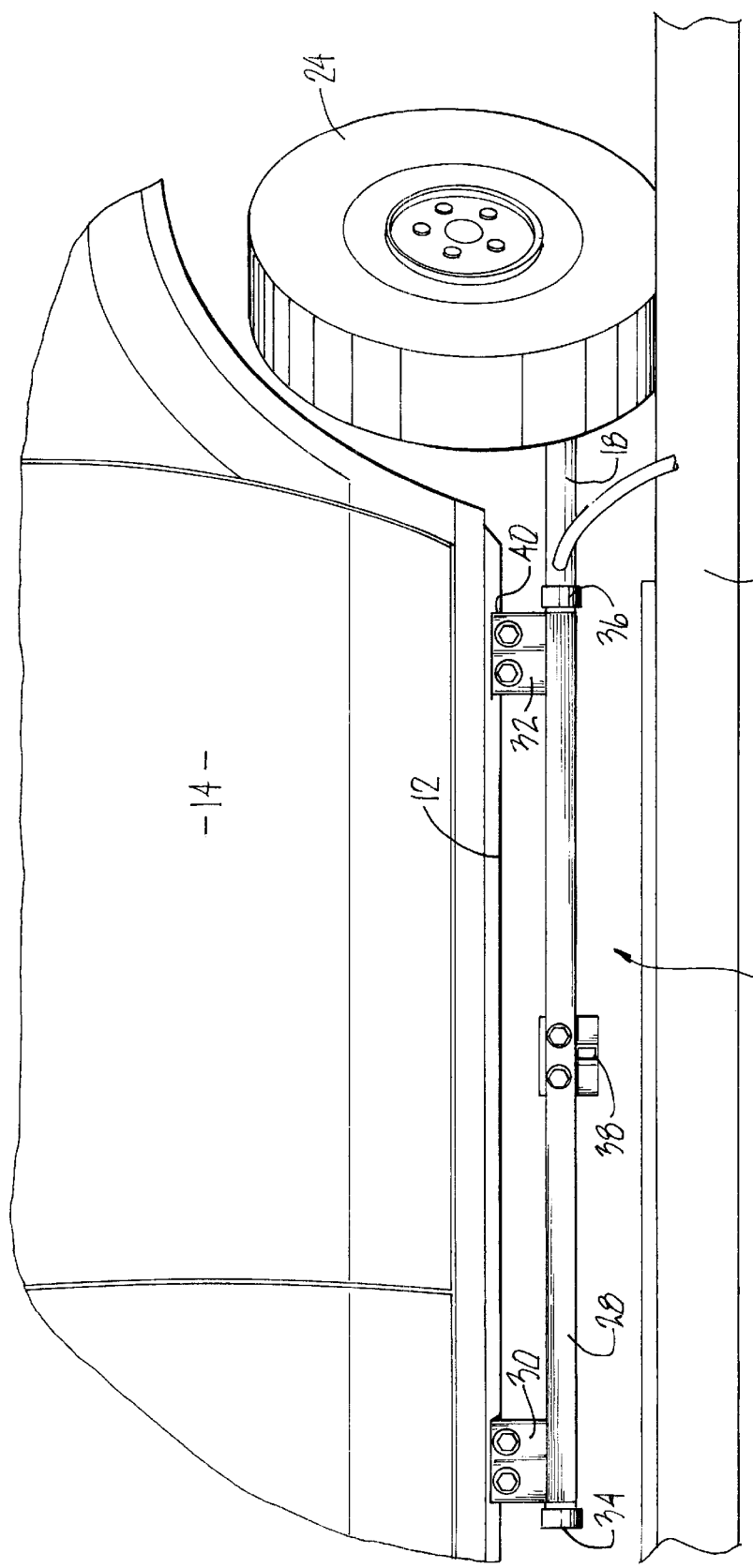
FIG. 1 is a front elevation view of the caster adjustment tool of the present invention mounted to the rocker panel of a car shown as a partial view.
Figure 2:
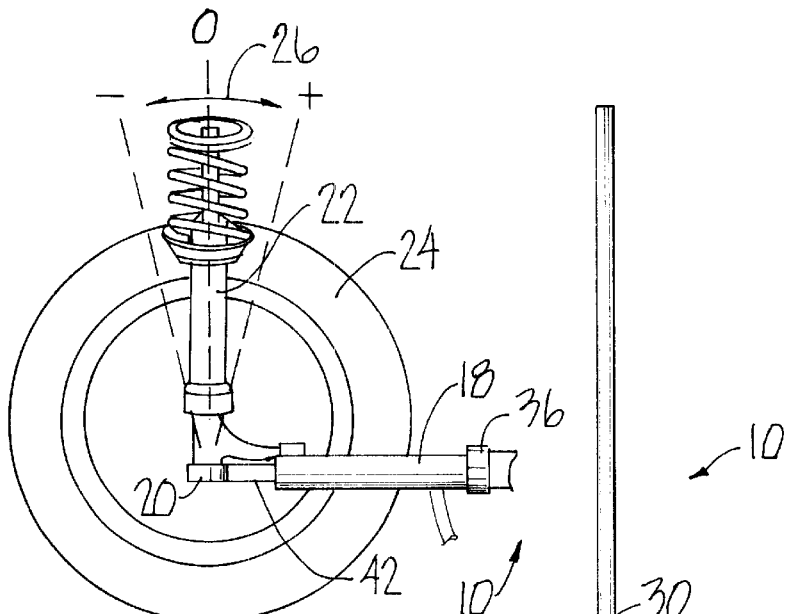
FIG. 2 is a side elevation view of a steering and suspension for a right front wheel of a vehicle showing the caster angles.
Figure 3:
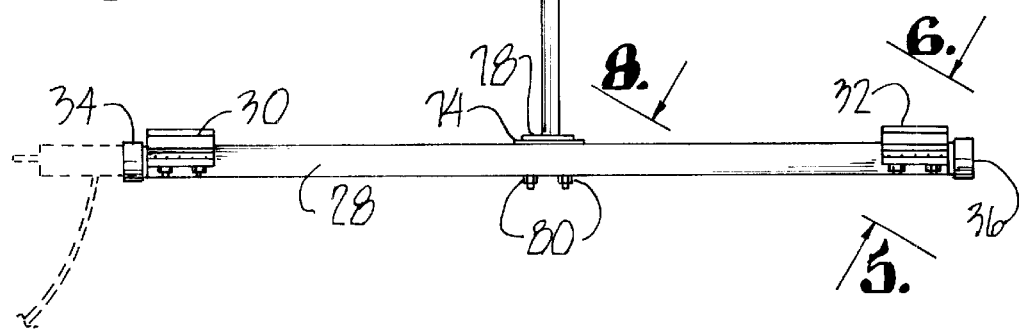
FIG. 3 is a plan view of the caster adjustment tool of the present invention.
Figure 4:
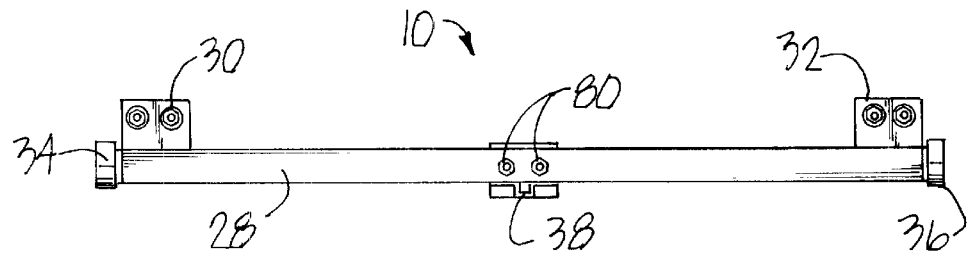
FIG. 4 is a side elevation view of the caster adjustment tool of the present invention.

Referring initially to FIGS. 1 and 2, caster adjustment tool 10 is mounted to the vertical pinch weld 12 of automobile 14 (shown as partial view). Automobile 14 is supported on rack 16. Hydraulic jack 18 extends from the end of caster adjustment tool 10 to the lower control arm 20 near the lower pivot point such as the lower ball joint of the steering and suspension 22 to which wheel 24 is mounted.

Most roads have a crest or crown down the center of the road, which allows water to drain from the road. To offset road crown, the right front steering assembly has a more positive caster than the left front steering assembly. This unequal caster causes the vehicle to drift or pull to the side with the least positive caster. Thus, this unequal caster compensates for the road crown and allows the vehicle to travel straight down the road without drifting to the right. Typically, the caster angle 26 for passenger vehicles is between zero and five degrees positive.

Referring to FIGS. 1–4, caster adjustment tool 10 is generally T-shaped with a main rail 28, a pair of clamps 30 and 32 secured near the opposing ends of main rail 28 and a pair of cup-shaped end caps 34 and 36 secured to the outside end of clamps 30 and 32, respectively. A center stabilizing member or torsion bar 38 is secured to main rail 28 at approximately the midpoint and extends generally perpendicular from main rail 28. When caster adjustment tool 10 is mounted to a vehicle 14, center member 38 extends traversely under the vehicle 14 and is supported by a block or other support means (not shown) generally parallel to the lower plane of the vehicle. Center member 38 acts as a lever arm or torsion bar to limit rotation and twisting of main rail 28 when hydraulic pressure is applied to either end cap 34 or 36.

The proper caster for each side of the vehicle is determined by measuring from a vehicle manufacturer specified reference point (not shown) on the side of the vehicle such as a hole or bolt in the frame, to the lower control arm 20 on the steering and suspension assembly 22. These measurements on each side of the vehicle are compared to the vehicle specification to determine if the left and right casters are within the proper range. If either the right or left caster is out of tolerance, caster adjustment tool 10 is clamped to the pinch weld 12 along the side of vehicle 14.

A reference mark 40 is made using a grease pencil or other marker along pinch weld 12 toward the front of the vehicle to aid in determining when caster angle 26 has been properly adjusted. Referring, for example, to right front wheel 24, hydraulic jack 18 is placed between end cap 36 and lower control arm 20 and hydraulic piston 40 is extended until it contacts lower control arm 20. With a tape measure or other measuring instrument in place, the distance between pivot point 20 and the reference mark is increased by applying hydraulic pressure through hydraulic jack 18 to piston 42 to push pivot point 20 forward relative to the vehicle until pivot point 20 has been properly adjusted.

By way of example, the manufacturer-specified measurement for the right caster from the reference point (not shown) to the lower control arm 20 for the right caster may be 60 inches for a particular vehicle, When the right caster is measured at a front-end alignment shop, the measurement may be 58¾". The difference between the manufacturer's specification and the actual measurement is 1¼". Thus, the right pivot point 20 would need to be adjusted forward 1¼".

To make this adjustment using caster adjustment tool 10, the crown end of piston 42 of hydraulic porter power ram 18 is placed against the lower control arm 20 with piston 42 in the retracted position. An extension (not shown) may be added to the piston 42 to extend the reach of reach of piston 42. A reference mark 40 is made on pinch weld 28 at the other end of hydraulic jack 18. Caster adjustment tool 10 is held in place with clamps 30 and 32 over pinch weld 28 approximately one-half inch forward of reference mark 40. Clamps 30 and 32 are secured to pinch weld 40 by tightening bolts 48 to approximately 80 inch foot pound of torque. At the other side of the vehicle, stabilizer bar 38 is raised as high as possible to approximately parallel with the lower plane of vehicle 14 and supported in place with a block or other means. With caster adjustment tool 10 in place and a tape measure extending between lower control arm 20 and mark 40 on pinch weld 12, lower control arm 20 needs to be adjusted 1¼" forward relative to the mark placed on the pinch weld 12.

The base of porter power ram 18 is placed in cup 36 and the crown end of piston 42 is placed against lower control arm 20. Hydraulic pressure is applied through hydraulic jack 18 extending piston 42, which pushes lower control arm 20 forward to achieve the proper positive caster angle 26. Stabilizing center member 38 prevents main rail 28 from twisting under the pressure of hydraulic jack 18 against end cap 36. Once the proper caster angle 26 is achieved for the right steering and suspension assembly 22, caster adjustment tool 10 is removed and the process is repeated for the other side of the vehicle to adjust the left caster, if necessary.

Those skilled in the art will understand that only one clamp may be used to secure caster adjustment tool 10 to pinch weld 28 to adjust the caster angle. The clamp nearest the lower control arm 20 to be adjusted should be clamped to pinch weld 28. The other end of main rail 28 may be supported on a block generally parallel to pinch weld 28.

Figure 5:
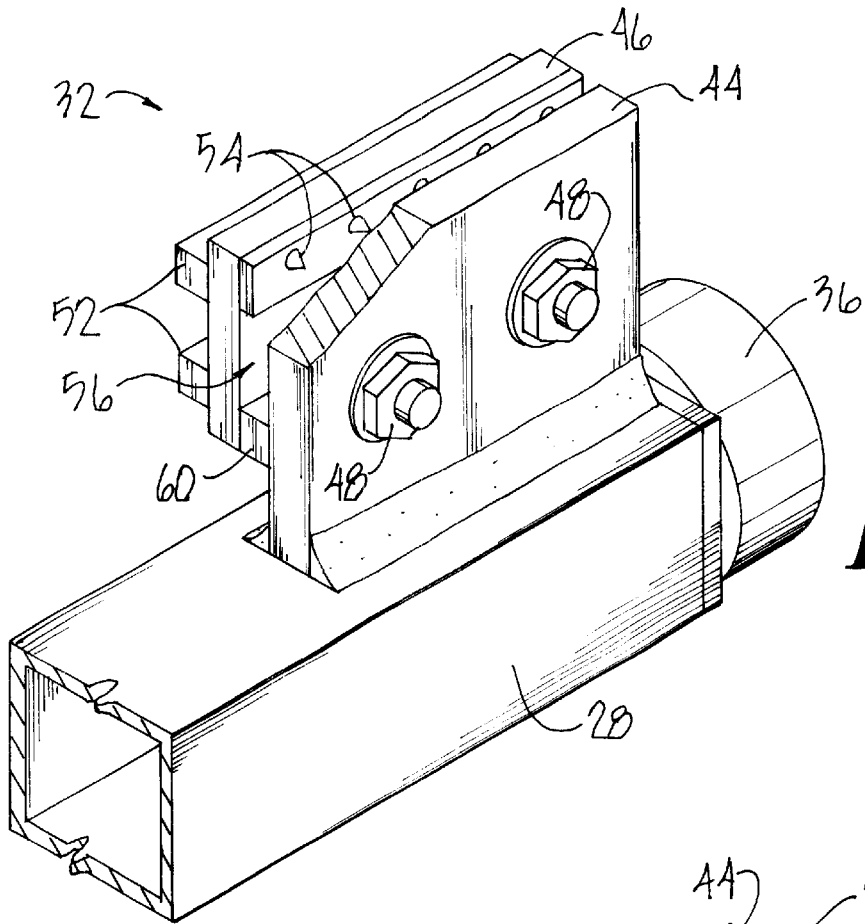
FIG. 5 is an enlarged perspective view of a vertical pinch weld clamp of a caster adjustment tool along line S shown in FIG. 4.
Figure 6:
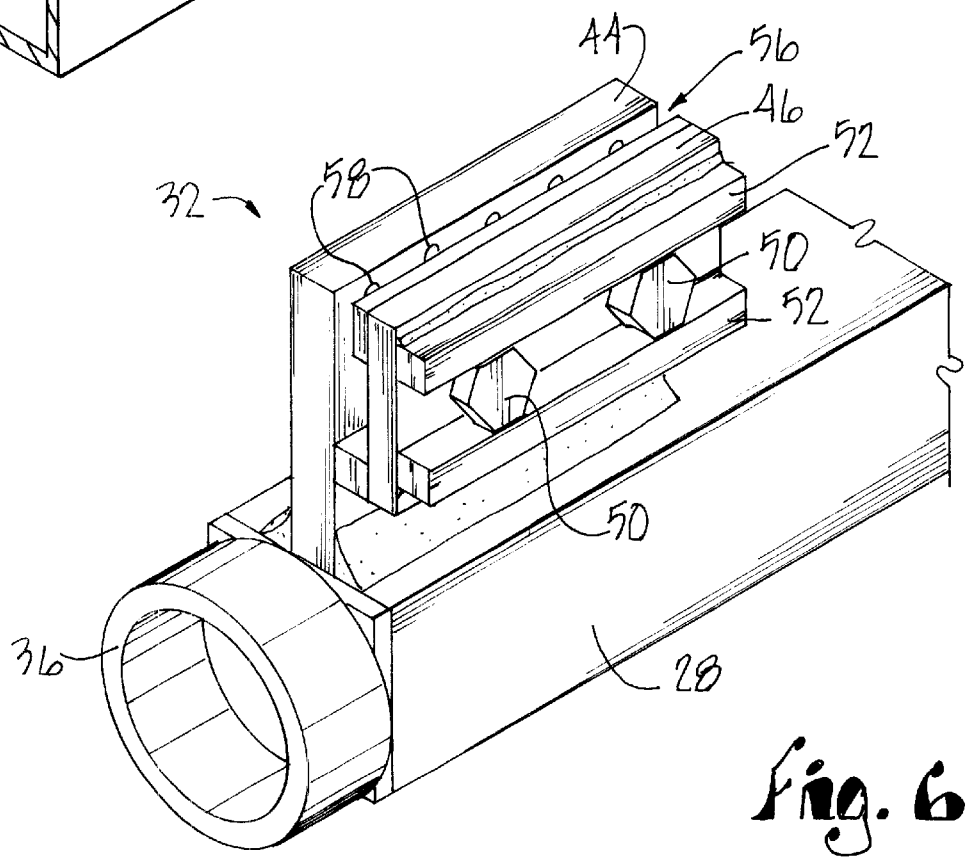
FIG. 6 is an enlarged perspective view of a vertical pinch weld clamp of the caster adjustment tool along line 6 shown in FIG. 4.

Referring to FIGS. 5 and 6, a cut-away view of vertical pinch weld clamp 32 is shown. Clamp 32 includes a back plate 44 and a clamp plate 46. Back plate 44 may be welded or otherwise fastened to main rail 28. Clamp plate 46 is adjustably secured to back plate 44 with bolts 48 extending through apertures (not shown) and back plate 44 which are in axial alignment with apertures (not shown) in clamp plate 46. Bolts 50 are prevented from rotation during adjustment of clamp 32 by bolt retaining blocks 52 when nuts 48 are turned. A plurality of tines or gripping points 54 extend from clamp plate 46 into the pinch weld channel 56 formed between back plate 44 in clamp plate 46. Tines 54 are in axial alignment with generally coned-shaped recesses 58 in back plate 44.

An offset block 60 helps maintain the alignment of clamp plate 46 with back plate 44 when clamp 32 is adjusted. End cap 36 is welded or fastened generally perpendicularly to back plate 44 and main rail 28. When caster adjustment tool 10 is clamped to pinch weld 10 (FIG. 1), bolts 48 are tightened until tines 54 securely grip pinch weld 12 to prevent clamps 30 and 32 from slipping when hydraulic pressure is applied.

In the preferred embodiment, main rail 28 and center member 38 are constructed of square, steel tubing. End caps 34 and 36 may be made of steel or iron pipe. The components of clamps 30 and 32 may be constructed of three-eighths to one-half inch steel plate, steel bolts and tines.

Referring to FIG. 7, a horizontal pinch weld clamp 62 is shown. Clamp 62 is generally the same as clamp 32 except that it is configured to grip a horizontal pinch weld which is used on some cars, such as Hondas. Clamp 62 is generally C-shaped with the lower portion 64 welded to main rail 28. The upper portion 66 of clamp 62 includes a pair of apertures (not shown) in axial alignment with clamp plate 68 apertures (not shown). Clamp plate 68 is adjusted turning bolt 70 to tighten or loosen nut 72.

Referring to FIG. 8, a sectional perspective view of stabilizing center member or torsion bar 38 to main rail 28 is shown. End plate 74 is welded to the end of center member 38. Nut retaining blocks 76 prevent nuts 78 from turning when bolts 80 (FIGS. 3 and 4) are turned.

It should be appreciated from the foregoing disclosure that caster adjustment tool 10 may be used without effecting or interfering with front end alignment equipment which is known in the art.

It is to be understood that while certain forms of this invention have been illustrated and described, it is not limited thereto, except in so far as such limitations and their equivalents are included in the following claims.

Having thus described the invention, what is claimed as new and desired to be secured by Letters Patent is:

1. An apparatus for adjusting the caster angle of a steering assembly of a unibody vehicle having a rocker panel pinch weld, said apparatus comprising:

a generally T-shaped frame, means for securing said frame to the rocker panel pinch weld, an expandable adjustment means mounted between said frame and a lower control arm of said steering assembly for movement of said lower point from a first position to a second position, and means for expanding said adjustment means whereby moving said lower control arm from said first position to said second position.

2. The apparatus as claimed in claim 1 wherein said securing means includes a pair of opposed clamps attached to one leg of said T-shaped frame.

3. The apparatus as claimed in claim 2 wherein said other leg of said T-shaped frame extends under the vehicle.

4. The apparatus as claimed in claim 3 wherein said other leg of said T-shaped frame is supported generally coplanar with a lower surface of the vehicle.

5. The apparatus as claimed in claim 1 wherein said adjustment means is a power porter ram.

6. The apparatus as claimed in claim 5 wherein said means for expanding said adjustment means in hydraulic pressure.

7. The apparatus as claimed in claim 1 wherein said adjustment means is a screw jack, having an adjustment screw.

8. The apparatus as claimed in claim 7 wherein said means for expanding said adjustment means is rotation of said adjustment screw.

9. An apparatus for adjusting the caster angle of a steering assembly for a unibody frame vehicle having a rocker panel pinch weld, said apparatus comprising:

a fixed member having opposed ends, clamping means secured proximal said opposed ends of said fixed member, for removably securing said fixed member to the pinch weld of the rocker panel, a stabilizing member having a first end secured to said fixed member and a second free end extending generally perpendicularly to said fixed member;

an expandable member having a base and a translating member slidably secured to said base and extendable from said base for movement between a first position and second position, a pair of end caps adapted to receive said expandable member base mounted between said frame and said a lower control arm of said steering assembly, means for extending said translating member whereby moving said translating member from said first position to said second position and whereby engaging said lower control arm and moving said lower control arm from a first position relative to said frame to a second position relative to said frame.

10. The apparatus as claimed in claim 9 wherein said expandable member comprises an hydraulic porter ram.

11. The apparatus as claimed in claim 9 wherein said stabilizing member is supported generally horizontally.

12. The apparatus as claimed in claim 9 wherein said clamping means comprise a pair of vertical pinch weld clamps.

13. The apparatus as claimed in claim 9 wherein said clamping means comprises a pair of horizontal pinch weld clamps.

14. A method of adjusting the caster angle of a steering assembly of a unibody vehicle having a rocker panel pinch weld comprising the step of:

measuring the distance from a reference point on the lower surface of the vehicle to a lower control arm of said steering assembly, comparing said measured distance to an acceptable value for said vehicle, making an end mark on said pinch weld corresponding to the length of an hydraulic porter ram from said lower control arm to said pinch weld;

aligning a first caster adjustment tool main rail approximately with said end mark;

clamping said main rail to said pinch weld, supporting a stabilizing member secured to and extending generally perpendicularly to said main rail in a generally horizontal position, mounting said hydraulic porter ram between said first end of said main rail and said lower control arm, and expanding said porter ram to adjust said distance from said reference point to said lower control arm from said measured distance to said acceptable distance.

15. The method as claimed in claim 14 further comprising removing said caster adjustment tool and repeating for the other side of the vehicle.

* * * * *